US006011119A

United States Patent [19]

Matsumoto et al.

[11] Patent Number: 6,011,119

[45] Date of Patent: Jan. 4, 2000

[54] RESIN COMPOSITION FOR ELECTROPHOTOGRAPHIC TONER, AND TONER

[75] Inventors: Katsuru Matsumoto; Nobuhiro Hirayama, both of Kanagawa-ken; Eishi Tanaka, Chiba-ken; Junko Tobita, Kanagawa-ken, all of Japan

[73] Assignee: Mitsui Chemicals, Inc., Tokyo, Japan

[21] Appl. No.: 08/684,195

[22] Filed: Jul. 19, 1996

[30] Foreign Application Priority Data

| | | | |
|---|---|---|---|
| Jul. 28, 1995 | [JP] | Japan | 7-192785 |
| Sep. 25, 1995 | [JP] | Japan | 7-245897 |
| Sep. 29, 1995 | [JP] | Japan | 7-253325 |

[51] Int. Cl.[7] .......... C08L 33/02; C08L 33/08; C08L 33/10

[52] U.S. Cl. .......... 525/221; 430/109; 430/904; 525/225

[58] Field of Search .......... 525/221, 225; 430/109, 904

[56] References Cited

U.S. PATENT DOCUMENTS

| | | | |
|---|---|---|---|
| 4,727,010 | 2/1988 | Shin et al. . | |
| 4,883,734 | 11/1989 | Ikeuchi et al. | 430/109 |
| 5,468,585 | 11/1995 | Matsumoto et al. | 525/221 |
| 5,744,276 | 4/1998 | Ohno et al. | 430/109 |

FOREIGN PATENT DOCUMENTS

| | | |
|---|---|---|
| 0427278 | 5/1991 | European Pat. Off. . |
| 0488413 | 6/1992 | European Pat. Off. . |
| 0568309 | 11/1993 | European Pat. Off. . |
| 0618511 | 10/1994 | European Pat. Off. . |
| 0662641 | 7/1995 | European Pat. Off. . |
| 5-88472 | 12/1993 | Japan . |

OTHER PUBLICATIONS

Lee, et al., "The Glass Transition Temperatures of Polymers", Polymer Handbook, Brandkup et al., ed., Joh Wiley & Sons, New York, pp. III/139–142 (1975).

JP61–123,856 Abstract, Accession No. 86–192353, Derwent Information Ltd., (1986).

*Primary Examiner*—Donald R. Wilson
*Attorney, Agent, or Firm*—Burns, Doane, Swecker & Mathis, L.L.P.

[57] ABSTRACT

A resin composition is provided for an electro-photographic toner. The composition comprises 5 to 95 parts by weight of a high molecular weight vinyl copolymer polymer and 95 to 5 parts by weight of a low molecular weight vinyl copolymer. The former ethylene polymer has a weight average molecular weight (Mw) of from 200,000 to 1,000,000 and a ratio (Mw/Mn) of the weight average molecular weight (Mw) to a number average molecular weight (Mn) of from 8 to 300, and the latter vinyl copolymer has a weight average molecular weight of from 3,000 to 20,000. At least one of the former and latter vinyl copolymer, preferably, the former vinyl copolymer is an ethylene polymer which has been obtained by conducting polymerization in the presence of a monomer having an ionization potential of from 10.0 to 15.0 eV and a difference of from 9.0 to 15.0 eV in level between a highest occupied molecular orbital (HOMO) and a lowest unoccupied molecular orbital (LUMO), both determined by computational chemistry. The resin composition shows excellent charging characteristics even without a charge control agent or with a charge control agent in a reduced amount. A toner containing the resin composition is also provided.

3 Claims, No Drawings

RESIN COMPOSITION FOR ELECTROPHOTOGRAPHIC TONER, AND TONER

BACKGROUND OF THE INVENTION a) Field of the Invention

This invention relates to a resin composition for an electrophotographic toner useful in developing latent electrostatic images in electrophotography, electrostatic recording, electrostatic printing or the like and also to an electrophotographic toner comprising the resin composition.

b) Description of the Related Art

A toner for use in a copying machine or a printer is required to have sufficient “charging rise property”, that is, a property that the quantity of electricity charged on the toner instantaneously increases to an appropriate value in response to a start-up of a machine such as a copying machine or a printer. It has heretofore been the practice to add a metal-containing dye called a “charge control agent (CCA)”, such as a metal salicylate, to a toner so that the toner can be provided with improved chargeability. However, attempts have recently been made with a view to providing a toner resin itself with the function of CCA for the reduction of the amount of CCA or for the total elimination of CCA, because CCA contains a heavy metal, has high toxicity in many instances and is expensive.

Examples which are each directed to the use of a polymer containing a maleic acid derivative are disclosed, for example, in Japanese Patent Publication No. 88472/1993. This approach however involves problems such that toner particles cannot be charged evenly, fogging tends to occur and the developing performance is poor.

OBJECTS AND SUMMARY OF THE INVENTION

An object of the present invention is to provide a resin composition for an electrophotographic toner, said resin composition featuring a fast rise in charging and a sufficient quantity of charged electricity even in a CCA-free toner or a toner using CCA in a reduced amount, and also to furnish an electrophotographic toner comprising the resin composition and having properties required as an electrophotographic toner, namely, good thermal and physical properties and good fixing property at both high temperatures and low temperatures without developing problems such as offset and blocking.

The present inventors have proceeded with extensive research to overcome the above-described problems. As a result, it has been found that they can be overcome by specifying the electron energy level of a component of a resin, leading to the completion of the present invention.

In one aspect of the present invention, there is thus provided a resin composition for an electrophotographic toner, comprising:

5 to 95 parts by weight of a high molecular weight vinyl copolymer having a weight average molecular weight (Mw) of from 200,000 to 1,000,000 and a ratio (Mw/Mn) of the weight average molecular weight (Mw) to a number average molecular weight (Mn) of from 8 to 300, and 95 to 5 parts by weight of a low molecular weight vinyl copolymer having a weight average molecular weight (Mw) of from 3,000 to 20,000; and at least one of said high molecular weight vinyl copolymer and said low molecular weight ethylene polymer being a vinyl copolymer which has been obtained by conducting polymerization in the presence of a monomer (M) having an ionization potential (IP) of from 10.0 to 15.0 eV and a difference of from 9.0 to 15.0 eV in level between a highest occupied molecular orbital (HOMO) and a lowest unoccupied molecular orbital (LUMO), both determined by computational chemistry.

The above resin composition preferably has the following embodiments:

(a) The monomer (M) is selected from the group consisting of vinylpolycarboxylic acids, vinylsilanes and (meth) acryloyloxyalkyldicarboxylic acid esters.

(b) The monomer (M) is contained in an amount of from 3 to 45 parts by weight in 100 parts by weight of all monomers which make up the high molecular weight vinyl copolymer.

(c) The monomer (M) comprises, in combination, at least one monomer selected from the group consisting of maleic anhydride, itaconic anhydride, glutaconic anhydride and 2-carboxycinnamic anhydride and at least one of (meth) acryloyloxyalkyldicarboxylic acid esters represented by the following formula (1):

(1)

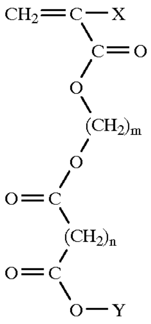

wherein m stands for an integer of from 1 to 7, n stands for an integer of from 1 to 3, X represents H or $CH_3$, and Y represents H, an alkyl group having 1 to 8 carbon atoms or a benzyl group.

(d) The low molecular weight vinyl copolymer has an acid value (AV) of from 0.5 to 200 mgKOH/g.

(e) The resin composition comprising the high molecular weight vinyl copolymer and the low molecular weight vinyl copolymer has a total acid value of from 0.5 to 200 mgKOH/g.

(f) The resin composition comprising the high molecular weight vinyl copolymer and the low molecular weight vinyl copolymer has a glass transition point (hereinafter abbreviated as “Tg”) of from 45 to 75° C.

(g) The high molecular weight vinyl copolymer comprises a polyfunctional monomer and/or a polyfunctional initiator as components thereof.

In another aspect of the present invention, there is also provided an electrophotographic toner comprising the above-described resin composition.

Due to the use of the above-described resin composition according to the present invention, sufficient charging characteristics (charge stability and charging rise property) can be brought about even in a toner without using any charge control agent (CCA) or in a toner composition containing CCA in a reduced amount. Further, the electrophotographic toner has good thermal and physical properties and good fixing property at both high temperatures and low temperatures without developing problems such as offset and blocking.

DETAILED DESCRIPTION OF THE INVENTION

The resin composition according to the present invention comprises the high molecular weight vinyl copolymer (hereinafter referred to as the "HMW vinyl copolymer" for the sake of brevity) and the low molecular weight vinyl copolymer (hereinafter referred to as the "LMW vinyl copolymer" for the sake of brevity). The HMW vinyl copolymer has a weight average molecular weight (Mw) of from 200,000 to 1,000,000 and a ratio of Mw to Mn (Mw/Mn) of from 8 to 300, preferably from 8 to 150.

These limitations are needed to provide a toner making use of the resin composition with high-temperature offset resistance. An HMW vinyl copolymer, whose Mw and Mw/Mn are smaller than 200,000 and 8, respectively, develop high-temperature offset tendency and is hence not preferred. Mw ranges preferably from 250,000 to 850,000, and Mw/Mn ranges preferably from 8 to 150, more preferably from 10 to 40.

An HMW vinyl copolymer whose Mw and Mw/Mn are greater than 1,000,000 and 300, respectively, is not preferred, because during a polymerization reaction, the reaction mixture tends to climb up an agitator of a reactor under the Weissenberg effect, thereby causing trouble from the standpoint of the production process and moreover, a high fixing temperature is also required. To achieve fixing at a temperature as low as possible, the weight average molecular weight (Mw) of the low molecular weight vinyl copolymer is required to be 20,000 or lower, more preferably in a range of from 3,000 to 10,000. With respect to the LMW vinyl copolymer, Mw higher than 20,000 is not preferred because upon fixing, the melt viscosity becomes higher and the lowest fixing temperature rises. Mw lower than 3,000, on the other hand, is not preferred because the toner strength is reduced, fine powder occurs in a large quantity and the productivity is lowered.

To achieve well-balanced blocking property, resin strength and the like when formed into a toner, the mixing ratio of the LMW vinyl copolymer to the HMW vinyl copolymer can range from 5:95 to 95:5, preferably from 10:90 to 90:10, more preferably from 15:85 to 85:15. Use of the HMW vinyl copolymer in a proportion greater than 95 parts by weight leads to a rise in fixing temperature, whereas use of the HMW vinyl copolymer in a proportion smaller than 5 parts by weight results in reductions in charging rise property and charge stability.

Further, the HMW ethylene polymer contains, as a constituent element thereof, a monomer (M) having a difference of from 9.0 to 15.0 eV, preferably from 9.0 to 12.5 eV in level between the highest occupied molecular orbital (HOMO) and the lowest unoccupied molecular orbital (LUMO), both determined by computational chemistry, and an ionization potential (IP) of from 10.0 to 15.0 eV, preferably from 10.0 to 13.5 eV, and the monomer (M) is contained in an amount of preferably from 3 to 45 parts by weight, more preferably from 6 to 45 parts by weight, still more preferably from 6 to 40 parts by weight, most preferably from 8 to 30 parts by weight in 100 parts by weight of all monomers which make up the HMW ethylene polymer.

The monomer (M) is required to have an energy difference of from 9.0 to 15.0 eV between its HOMO level and its LUMO level as determined by computational chemistry. A monomer having an energy difference outside the above range is not preferred, because it reduces a range of carriers usable in combination with the monomer.

Moreover, the ionization potential (IP) is required to be in the range of from 10.0 to 15.0 eV. This is a requirement from the standpoint of production of the polymer. IP smaller than 10.0 eV leads to excessively high reactivity, while IP greater than 15.0 eV results in unduly low reactivity. Ionization potentials outside the above range are therefore not preferred.

The calculation of various energy levels was conducted as will be described next.

Imaging the composition of a resin of a monomer (M), structural optimization was conducted with respect to the structure of a unit model consisting of an olefin moiety of each monomer (M) and hydrogen added thereto by using the AM1 approximation of the semi-empirical molecular orbital method program (MOPAC) 93, whereby a highest occupied molecular orbital (HOMO) energy level [hereinafter designated "E(HOMO)"] and a lowest unoccupied molecular orbital level [hereinafter designated "E(LUMO)"] were determined.

The results obtained by the above calculation are those of an isolated molecule system of 25° C.

Ionization potential (IP), electron affinity (hereinafter designated "EA"), an energy difference (hereinafter designated "E(DIFF)"] between E(HOMO) and E(LUMO) and work function (hereinafter designated "WF") were calculated as will be described hereinbelow.

Concerning first with IP, EA and E(DIFF), in accordance with the Koopmans' theorem [reported by T. Koopmans in Physica, 1, 104 (1933)], IP represents a value equal to E(HOMO) but of the opposite sign, i.e., $$IP=-(E(HOMO)) \quad (1)$$

Similarly, EA represents a value equal to E(LUMO) but of the opposite sign, i.e., $$EA=-(E(LUMO)) \quad (2)$$

E(DIFF) can therefore be expressed as follows:

$$E(DIFF)=E(LUMO)-E(HOMO)=IP-EA \quad (3)$$

Each work function (WF) was determined in accordance with the following relational expression [reported by N. R. Rajopadhye and S. V. Bhoraskar in J. Mater. Sci. Lett., 5, 603 (1986)]:

$$WF=E(DIFF)/2+EA \quad (4)$$

Specific examples of the monomer can be roughly classified into vinylpolycarboxylic acids, vinyl-silanes, (meth) acryloyloxyalkyldicarboxylic acid esters represented by the below-described formula (1) and other compounds.

Examples of the vinylpolycarboxylic acids include the following compounds, which will each be followed by parenthesized values, the former being IP and the latter E(DIFF):

1) 2-dodecenedicarboxylic acid (IP=10.2, E(DIFF)=10.4)
2) trans-butenedicarboxylic acid (10.4, 10.0)
3) 3,5-pyrazoledicarboxylic acid (10.1, 9.5)
4) 1,2,3-propylenetricarboxylic acid (11.6, 11.0)
5) 5-butene-1,2,3-tricarboxylic acid (10.9, 10.8)
6) 3-methoxy-5-methyl-4-oxo-2,5-hexadienoic acid (10.4, 10.8)

Examples of the vinylsilanes include the following compounds:

7) methacryloxymethyltrimethylsilane (10.3, 11.6)
8) trimethylsilyl methacrylate (10.5, 11.4)
9) tris(trimethylsiloxy)-3-methacryloxypropylsilane (10.3, 11.9)

10) methacryloxypropylmethyldiethoxysilane (10.8, 10.9)
11) acryloxytrimethylsilane (10.9, 11.2)
12) bistrimethylsilyl itaconate (10.9, 11.9)
13) (methacryloxymethyl)bis(trimethylsiloxy)-methylsilane (12.6, 10.8)
14) 2-(trimethylsiloxy)ethyl methacrylate (10.4, 12.0)
15) 2-(acryloxyethoxy)trimethylsilane (11.1, 10.4)
16) 3-methacryloxypropyltrimethoxysilane (12.4, 10.3)
17) 3-(methacryloxy)propyltriethoxysilane (13.8, 9.4)
18) 3-methacryloxypropyl bis(trimethylsiloxy)-methylsilane (11.8, 10.4)
19) (3-acryloxypropyl)methyl bis(trimethylsiloxy)-silane (12.1, 10.6)
20) (3-acryloxypropyl)dimethylmethoxysilane (13.4, 10.2)
21) (3-acryloxypropyl) tris(trimethylsiloxy)silane (10.5, 11.8)
22) (3-acryloxypropyl)trimethoxysilane (11.8, 10.6)
23) O-(trimethylsilyl) acrylate (10.3, 11.6)

Specific examples of the (meth)acryloyloxyalkyl-dicarboxylic acid esters represented by the formula (1) include the following compounds:

24) 2-methacryloyloxymethyl malonate (10.8, 10.4)
25) 2-methacryloyloxyethyl malonate (10.6, 10.5)
26) 2-methacryloyloxypropyl malonate (10.5, 10.2)
27) 2-methacryloyloxymethyl succinate (11.5, 10.4)
28) 2-methacryloyloxyethyl succinate (11.3, 10.5)
29) 2-methacyloyloxypropyl succinate (11.0, 10.2)
30) 2-methacryloyloxymethyl glutarate (11.8, 11.2)
31) 2-methacryloyloxyethyl glutarate (11.5, 10.9)
32) 2-methacyloyloxypropyl glutarate (11.4, 10.9)
33) 2-acryloyloxymethyl malonate (10.9, 10.5)
34) 2-acryloyloxyethyl malonate (10.8, 10.5)
35) 2-acryloyloxypropyl malonate (10.4, 10.2)
36) 2-acryloyloxymethyl succinate (11.4, 10.5)
37) 2-acryloyloxyethyl succinate (11.2, 10.5)
38) 2-acryloyloxypropyl succinate (11.1, 10.3)
39) 2-acryloyloxymethyl glutarate (11.6, 10.8)
40) 2-acryloyloxyethyl glutarate (11.5, 10.6)
41) 2-acryloyloxypropyl glutarate (11.2, 10.5)

The above-exemplified compounds are dicarboxylic acid monoesters represented by the formula (1) in which Y is H. It is however to be noted that diesters of the above compounds, said diesters being represented by the formula (1) in which Y is an alkyl group having 1–8 carbon atoms or a benzyl group, are also included.

Among the above-exemplified compounds, the (meth) acryloyloxyalkyldicarboxylic acid esters represented by the formula (1) (Compounds Nos. 24 to 41) are preferred with 2-methacryloyloxyethyl succinate being particularly effective. Further, it is most preferred to combine these preferred compounds with 1 to 20 parts by weight, preferably 5 to 15 parts by weight of at least one monomer selected from the group consisting of maleic anhydride, itaconic anhydride, glutaconic anhydride and 2-carboxycinnamic anhydride so that the total amount of the monomer (M) ranges from 3 to 45 parts by weight per 100 parts by weight of the total amount of the HMW vinyl copolymer and/or the LMW vinyl copolymer. When formulated into an electrophotographic toner, extremely good performance is exhibited in both charging rise property and charge stability.

Specific examples of the other compounds include the following compounds:

42) 2-hexanoic acid (10.3, 9.8)
43) 2-octenoic acid (10.2, 9.9)
44) glycol methacrylate (10.4, 10.2)
45) dihydroxymaleic acid (11.6, 12.2)
46) 2,3-epoxypropyl methacrylate (11.2, 12.2)
47) 2,3-epoxypropyl acrylate (11.4, 12.6)
48) ethyl 3-amino-4-pyrazolecarboxylate (10.5, 9.9)
49) 3-amino-4-pyrazolecarboxylic acid (10.4, 9.6)
50) 3-methylenedihydro-2(3H)-furanone (10.8, 9.8)
51) dimethylethylidene malonate (10.3, 12.0)
52) methyl 2-butenenoate 3-trimethylsiloxane (11.1, 10.8)
53) diethylethylidene malonate (10.8, 11.1)
54) diethylisopropylidene malonate (10.6, 10.7)
55) diethyl ethoxymethylenemalonate (10.9, 10.4)
56) ethyl 3,3-diethoxyacrylate (11.2, 10.6)
57) 2-cyanoethyl acrylate (11.4, 10.9)
58) ethoxyethoxyethyl acrylate (11.9, 10.8)
59) isooctadecylsuccinic anhydride (11.7, 11.4)
60) 2,2,6-trimethyl-4H-1,3-dioxin-4-one (10.9, 11.9)
61) monobutyl maleate (11.3, 12.1)
62) dioctyl fumarate (11.2, 12.1)
63) glutaconic acid (11.3, 10.1)
64) maleic anhydride (11.8, 11.9)
65) dimethylitaconic acid (13.4, 10.2)
66) (E)-2-octadecenic anhydride (11.8, 10.6)
67) 2-(2-methoxyethoxy)ethyl acrylate (12.2, 10.8)
68) 2-methylenesuccinic acid (10.8, 11.1)
69) 2-furanylmethyl acrylate (12.4–13.6)
70) isopropylidenesuccinic acid (11.2, 10.8)
71) methyl 3-acetoxycrotonate (10.8, 11.4).

The above-described monomer may be contained in the HMW vinyl copolymer and/or the LMW vinyl copolymer. It is however preferred that the monomer is contained in the HMW vinyl copolymer.

The LMW vinyl copolymer has a weight average molecular weight (Mw) of 20,000 or lower and an acid value (AV) of from 0.5 to 200 mgKOH/g, preferably, from 0.5 to 150 mgKOH/g.

An LMW vinyl copolymer whose acid value (AV) is smaller than 0.5 mgKOH/g is not preferred, because it can hardly provide a toner which is satisfactory in both charging rise property and charge stability. On the other hand, an LMW vinyl copolymer whose acid value (AV) is greater than 200 mgKOH/g is not preferred because it leads to a toner which has high hygroscopicity and hence tends to develop blocking.

The resin composition according to the present invention, which comprises the HMW vinyl copolymer and the LMW vinyl copolymer, is also required to have a total acid value of 200 mgKOH/g or smaller, preferably in a range of from 0.5 to 150 mgKOH/g. A total acid value (TAV) greater than 200 mgKOH/g is not preferred, because it leads to a toner having high hygroscopicity and hence tendency to develop blocking.

Illustrative of the monomer for obtaining the HMW and LMW vinyl copolymer useful in the practice of the present invention are, but are not limited to:

styrene monomers such as styrene, $\alpha$-methylstyrene, halogenated styrenes, vinyltoluene, 4-sulfonamidostyrene, and 4-styrenesulfonic acid;

(meth)acrylate esters such as methyl (meth)acrylates, ethyl (meth)acrylates, propyl (meth)acrylates, n-butyl (meth)acrylates, isobutyl (meth)acrylates, octyl (meth) acrylates, dodecyl (meth)acrylates, lauryl (meth)acrylates, stearyl (meth)acrylates, cyclohexyl (meth)acrylates, phenyl (meth)acrylates, benzyl (meth)acrylates, furfuryl (meth) acrylates, hydroxyethyl (meth)acrylates, hydroxybutyl (meth)acrylates, dimethylaminomethyl (meth)acrylates, dimethylaminoethyl (meth)acrylate, 2-ethylhexyl (meth)-acrylates, and 2-chloroethyl (meth)acrylates;

itaconate esters such as dimethyl itaconate, dipropyl itaconate, butyl itaconate, dioctyl itaconate, and diamyl itaconate;

unsaturated carboxylic acids and unsaturated dicarboxylic acids, such as (meth)acrylic acids, cinnamic acids, maleic acid, fumaric acid, and itaconic acid;

maleate esters and fumarate esters, for example, those containing a linear or branched alkyl group having 1–8 carbon atoms, such as diethyl maleate, dipropyl maleate, dibutyl maleate, dipentyl maleate, dihexyl maleate, diheptyl maleate, dioctyl maleate, ethylbutyl maleate, ethyloctyl maleate, butyloctyl maleate, butylhexyl maleate, pentyloctyl maleate, diethyl fumarate, dipropyl fumarate, dibutyl maleate, dipentyl fumarate, dihexyl fumarate, diheptyl fumarate, dioctyl fumarate, ethylbutyl fumarate, ethyloctyl fumarate, butyloctyl fumarate, butylhexyl fumarate, and pentyloctyl fumarate; and others such as 2-vinylnaphthalene, itaconic anhydride, and maleic anhydride.

Examples of the polyfunctional monomer or polyfunctional initiator include:

styrene monomers such as divinylbenzene;

acrylic polyfunctional monomers such as 1,3-butylene glycol diacrylate, 1,5-pentanediol diacrylate, neopentyl glycol diacrylate, 1,6-hexanediol diacrylate, diethylene glycol diacrylate, triethylene glycol diacrylate, tetraethylene glycol diacrylate, polyethylene glycol diacrylate, polyethylene glycol #400 diacrylate, polyethylene glycol #600 diacrylate, polypropylene glycol diacrylate, N,N'-methylenebisacrylamide, pentaerythritol triacrylate, trimethylolpropane triacrylate, tetramethylolmethane tetraacrylate, and 1,4-butanediol diacrylate;

methacrylic polyfunctional monomers such as ethylene glycol dimethacrylate, 1,3-butylene glycol dimethacrylate, neopentyl glycol dimethacrylate, 1,6-hexanediol dimethacrylate, diethylene glycol dimethacrylate, triethyleneglycol dimethacrylate, polyethylene glycol #200 dimethacrylate, polyethylene glycol #400 dimethacrylate, polyethylene glycol #600 dimethacrylate, dipropylene glycol dimethacrylate, polypropylene glycol dimethacrylate, trimethylolethane trimethacrylate, trimethylolpropane trimethacrylate, 2,2-bis(4-methacryloxypolyethoxyphenyl) propane, aluminum methacrylate, calcium methacrylate, zinc methacrylate, and magnesium methacrylate;

peroxides such as t-butyl peroxymethacrylate, t-butyl peroxycrotonate, di(t-butylperoxy) fumarate, t-butylperoxy allylcarbonate, tri-t-butyl pertrimellitate, tri-t-amyl pertrimellitate, tri-t-hexyl pertrimellitate, tri-t-1,1,3,3-tetramethylbutyl pertrimellitate, tri-t-cumyl pertrimellitate, tri-t-(p-isopropyl)cumyl pertrimellitate, tri-t-butyl pertrimesate, tri-t-amyl pertrimesate, tri-t-hexyl pertrimesate, tri-t-1,1,3,3-tetramethylbutyl pertrimesate, tri-t-cumyl pertrimesate, tri-t-(p-isopropyl)cumyl pertrimesate, 2,2-bis(4,4-di-t-butylperoxycyclohexyl)propane, 2,2-bis(4,4-di-t-hexylperoxycyclohexyl)propane, 2,2-bis(4,4-di-t-amylperoxycyclohexyl)propane, 2,2-bis(4,4-di-t-octylperoxycyclohexyl)propane, 2,2-bis(4,4-di-a-cumylperoxycyclohexyl)propane, 2,2-bis(4,4-di-t-butylperoxycyclohexyl)butane; and 2,2-bis(4,4-di-t-octylperoxycyclohexyl)butane; and others such as diallyl phthalate, triallyl cyanurate, triallyl isocyanurate, triallyl trimellitate, diallyl chlorendate, and ethylene glycol diglycidyl ether acrylate.

At least one of such polyfunctional monomers and polyfunctional initiators is used.

As processes for the polymerization of the HMW vinyl copolymer and the LMW ethylene polymer, it is particularly preferred to conduct the polymerizations as will be described below.

Polymerization process of the HMW ethylene polymer (i) Bulk polymerization: In this stage, at a polymerization temperature of from 90 to 120° C., the monomer (M), either in its entirety or in part, is polymerized in combination with another copolymerizable monomer, or other copolymerizable monomers are polymerized. The polymerization degree in this stage is controlled at 45 to 55%.

(ii) Solvent dilution: The polymerization product is diluted with a solvent such as toluene or xylene in an amount of 30 to 70 parts by weight per 100 parts by weight of the monomers.

(iii) Addition: Any remaining portion of the monomer (M) is added at once in its entirety or in part.

(iv) Solution polymerization: To the above system, the whole part of any remaining portion of the monomer (M), a solvent such as toluene or xylene and a catalyst are continuously added dropwise at a temperature of from 100 to 140° C. over 5 to 10 hours.

(v) Post-polymerization: Polymerization is allowed to proceed under heat for 1 to 3 hours at the same temperature as that of the solution polymerization or in a temperature range up to +10° C.

(vi) Polymerization of any remaining monomer(s): A catalyst is added and at a temperature of from 70 to 110° C., polymerization is brought to completion so that a polymerization degree of from 97 to 100% is achieved.

Polymerization process of the LMW vinyl copolymer:

(i) Solution polymerization: A reaction system is charged with 50 to 200 parts by weight of a solvent such as toluene or xylene and at a temperature of from 100 to 140° C., a mixture of a combination of the monomer (M), either in its entirety or in part, and another copolymerizable monomer and a catalyst or a mixture of other copolymerizable monomers and a catalyst is continuously added dropwise over 5 to 10 hours.

(ii) Post-polymerization: Polymerization is allowed to proceed under heat for 1 to 3 hours at the same temperature as that of the solution polymerization or in a temperature range up to +10° C.

(iii) Polymerization of any remaining monomer(s): A catalyst is added and at a temperature of from 70 to 110° C., polymerization is brought to completion so that a polymerization degree of from 97 to 100% is achieved.

To an extent not impairing the advantages of the present invention, it is possible to add, as needed, a binder resin, for example, polyvinyl chloride, a polyolefin resin, a polyester resin, polyvinyl butyral, a polyurethane resin, a polyamide resin, rosin, a terpene resin, a phenol resin, an epoxy resin, or paraffin wax.

In the present invention, the mixed resin of the HMW and LMW vinyl copolymer generally amounts to 50 to 95% of the total weight of the toner.

The resin composition according to the present invention may be added with a low molecular weight polyolefin wax to provide improved physical properties when formulated into a toner. This low molecular weight polyolefin wax can be either an unmodified polyolefin wax or a modified polyolefin wax with a modification component block- or graft-copolymerized on an olefin component.

The low molecular weight polyolefin wax may preferably amount to 5 to 20.% of the total weight of the toner.

Specific examples of the polyolefin wax include—in addition to commercial products such as "Viscol 660P" and "Viscol 550P" (trade names; products of Sanyo Chemical Industries, Ltd.), "Polyethylene 6A" (trade name; product of Allied Chemical Co., now, Allied Signal, Inc.), "High Wax 400P", "High Wax 100P", "High Wax 200P", "High Wax 320P", "High Wax 220P", "High Wax 2203P", and "High Wax 4202P" (trade names; products of Mitsui Petrochemical Industries, Ltd.), and "Hoechst Wax PE520", "Hoechst Wax PE130" and "Hoechst Wax PE190", (trade names; products of Hoechst Japan Limited)—polyethylene wax block- or graft-copolymerized with methyl methacrylate, polyethylene wax block- or graft-copolymerized with butyl methacrylate, and polyethylene wax block- or graft-copolymerized with styrene. Such a polyolefin wax is generally mixed with the resin composition upon conducting melting and kneading for the production of a toner. It may however be added upon polymerization of one of the vinyl copolymer or upon elimination of the solvent therefrom.

A colorant is usually employed in a toner making use of the resin composition according to the present invention. Usable colorants include, for example, black pigments such as carbon black, acetylene black, lamp black and magnetite; and known pigments such as chrome yellow, yellow iron oxide, hanza yellow G, quinoline yellow lake, permanent yellow, NCG molybdenum orange, vulcan orange, indanthrene, brilliant orange GK, red iron oxide, brilliant carmine 6B, flizarin lake, fast violet B, cobalt blue, alkali blue lake, phthalocyanine blue, pigment green B, fast sky blue, malachite green lake, titanium oxide and zinc white. The colorant can be used generally in an amount of from 5 to 300 parts by weight per 100 parts by weight of the resin composition. It is also possible, as needed, to choose and add a pigment dispersant, an offset preventive and/or the like to the resin composition according to the present invention and then to formulate the resultant mixture into a toner in a manner known per se in the art.

Described specifically, the resin composition with the above-described various additives mixed therein is premixed in a Henschel mixer, followed by kneading in a heated and fused state in a kneader or the like. After cooling, the thus-kneaded mixture is finely pulverized in a jet pulverizer and then classified, whereby particles generally in a range of from 8.0 to 20.0 μm are collected to provide a toner.

To obtain a magnetic toner, magnetic powder can be incorporated. Illustrative of such magnetic powder are powders of ferromagnetic materials which are magnetized in a magnetic field, that is, powders of metals such as iron, nickel and cobalt and powders of alloys such as magnetite and ferrite. Such magnetic powder may amount preferably to 15 to 70% of the total weight of a toner.

Further, the resin composition according to the present invention may be added with a parting agent such as that to be described below upon polymerization or solvent ellination or upon melting and kneading. The term "parting agent" as used herein means a substance which at the time of fixing, is brought into contact with a fixing roller and acts to reduce friction and to improve parting property or which acts to improve flowability upon melting. Illustrative of the parting agent are paraffin waxes, higher (saturated linear) fatty acids (carbon number: 12 to 50), higher alcohols (carbon number: 8 to 32), fatty acid metal salts, fatty acid amides, metal soaps, and polyhydric alcohols.

For the toner according to the present invention, a colorant and/or a powder flowability improver can be used by mixing them (as additional components).

Further, to prevent aggregation of toner particles themselves and to improve their flowability as powder, a powder flowability improver such as fine TEFLON (trade mark; product of E.I. du Pont de Nemours & Co., Inc.) powder can be added.

The present invention will next be described in further detail by the following examples. It should however be borne in mind that the present invention is not limited by the following examples. Incidentally, all designations of "part" or "parts" will hereinafter mean part or parts by weight unless otherwise specifically indicated.

(Production Examples of HMW Vinyl Copolymer)

Production Examples 1–10 (Invention Production Examples)

A 5-ℓ four-necked flask was fitted with a condenser, a thermometer, a nitrogen gas inlet tube and a stirrer and was then charged with 75.0 parts of styrene and 25.0 parts of monobutyl maleate. After the internal temperature was raised to 120° C., the contents were maintained at the same temperature and were subjected to bulk polymerization for 8.4 hours. Fifty parts of xylene and 0.3 part of divinylbenzene were then added, and 3.0 parts of t-butyl peroxide, 50.0 parts of xylene and 0.2 part of divinylbenzene, which had been mixed into a solution beforehand, were continuously added dropwise over 7.5 hours. The reaction was then allowed to continue for 1 hour and the polymerization was ended, whereby Polymer 1 was obtained.

Polymers 2 to 10 were obtained as in Production Example 1 under their corresponding conditions shown in Table 1-1 to Table 1-2.

Production Example 11 (Invention)

Polymer 11 was obtained in a similar manner as Production Example 1 except that the bulk polymerization time was changed to 6.5 hours.

Production Example 12 (Invention)

Polymer 12 was obtained in a similar manner as Production Example 1 except that the amount of divinyl-benzene was changed to 0.4 part.

Production Example 13 (Invention)

Polymer 13 was obtained in a similar manner as Production Example 1 except that the internal temperature upon bulk polymerization was changed to 100° C. and the amount of divinyl benzene was changed to 0.4 part.

Production Example 14 (Comparative)

Polymer 14 was obtained in a similar manner as Production Example 1 except that the bulk polymerization time was changed to 3.5 hours and the time of the continuous dropwise addition was changed to 6.0 hours.

Production Example 15 (Comparative)

Polymer 15 was obtained in a similar manner as Production Example 1 except that the bulk polymerization time was changed to 8.5 hours and the amount of divinylbezene was changed to 0.5 part.

Production Example 16 (Invention)

Polymer 16 was obtained in a similar manner as Production Example 1 except that the amount of divinylbenzene was changed to 0.1 part.

Production Example 17 (Invention)

Polymer 17 was obtained in a similar manner as Production Example 1 except that the amount of divinyl-benzene was changed to 0.4 part.

Production Example 18 (Invention)

Polymer 18 was obtained in a similar manner as Production Example 1 except that the amount of divinylbenzene was changed to 0.8 part.

Production Example 19 (Comparative)

Polymer 19 was obtained in a similar manner as Production Example 1 except that the amount of divinylbenzene was changed to 0.0 part.

Production Example 20 (Comparative)

Polymer 20 was obtained in a similar manner as Production Example 1 except that the amount of divinylbenzene was changed to 5.0 parts.

(Production Examples of LMW Vinyl Copolymer)

Production Example 21 (Invention)

A 5-ℓ four-necked flask fitted with a condenser, a thermometer, a nitrogen gas inlet tube and a stirrer was charged with 100.0 parts of xylene as a solvent. While introducing nitrogen gas, the xylene was heated to a reflux temperature, followed by the continuous dropwise addition of a mixed solution of 95.0 parts of styrene, 5.0 parts of methacrylic acid and 10.0 parts of t-butyl peroxy-2-ethylhexanoate over 6.5 hours. After post-polymerization was conducted for 1 hour, any remaining portion of the styrene was polymerized, thereby obtaining Polymer 21 whose Mw was 5,600.

Production Example 22 (Invention Production Example)

Polymer 22 was obtained in a similar manner as Production Example 21 except that the amount of the xylene solvent was changed to 150 parts.

Production Example 23 (Invention)

Polymer 23 was obtained in a similar manner as Production Example 21 except that the amount of the t-butyl peroxy-2-ethylhexanoate solvent was changed to 7.0 parts.

Production Example 24 (Invention)

Polymer 24 was obtained in a similar manner as Production Example 21 except that the amount of the xylene solvent was changed to 50 parts and the amount of t-butyl peroxy-2-ethylyhexanoate was changed to 6.0 parts.

Production Example 25 (Comparative)

Polymer 25 was obtained in a similar manner as Production Example 21 except that the amount of the xylene solvent was changed to 150 parts and the amount of 5-butyl peroxy-2-ethylhexanoate was changed to 18.0 parts.

Production Example 26 (Comparative)

Polymer 26 was obtained in a similar manner as Production Example 21 except that the amount of the xylene solvent was changed to 50 parts and the amount of the t-butylperoxy-2-ethylhexanoate was changed to 3.0 parts.

Production Example 27 (Invention)

Polymer 27 was obtained in a similar manner as Production Example 21 except that the monomer composition was changed to 99.8 parts of styrene and 0.2 part of methacrylic acid.

Production Example 28 (Invention)

Polymer 28 was obtained in a similar manner as Production Example 21 except that the monomer composition was changed to 97.7 parts of styrene and 2.3 parts of methacrylic acid.

Production Example 29 (Invention)

Polymer 29 was obtained in a similar manner as Production Example 21 except that the monomer composition was changed to 79.0 parts of styrene and 21.0 parts of methacrylic acid.

Production Example 30 (Comparative)

Polymer 30 was obtained in a similar manner as Production Example 21 except that the monomer composition was changed to 100.0 parts of styrene.

Production Example 31 (Comparative)

Polymer 31 was obtained in a similar manner as Production Example 21 except that the monomer composition was changed to consist of 67.5 parts of styrene 32.5 parts of methacrylic acid.

Measurements of physical properties of HMW and LMW vinyl copolymer obtained in the above production examples were as will be described hereinafter.

Measurement of Molecular Weight

The molecular weight of each polymer was determined by GPC while using a commercial monodisperse standard polystyrene as a standard, tetrahydrofuran as a solvent and a refractive index meter as a detector.

Detector: "SHODEX RI SE-31"

Columns: "A-80M"×2+"KF-802"

Solvent: THF (tetrahydrofuran)

Delivery rate: 1.2 mℓ/min

Sample: 0.25% THF solution

Measurement of the Quantity of Charged Electricity

The quantity of electricity charged on each vinyl copolymer was determined by solidifying the vinyl copolymer as powder, crushing the powder to a particle size of 3 mm in diameter in a commercial pulverizer, finely pulverizing the so-crushed particles in a jet pulverizer equipped with grinding plates so that the 50% volume average particle size became 25 μm or smaller, obtaining a charged-electricity-measuring sample (R) having a volume average particle size of 5–25 μm through an air classifier, mixing the sample with a silicone-coated, powdery iron carrier (C) at a ratio of 98:2 (R/C=98/2), mixing the thus-obtained mixture at 22° C. and 55% R.H. in a tumbler shaker mixer, collecting samples at predetermined intervals, and then measuring the quantity of electricity charged on each of the samples by a blow-off triboelectricity measuring instrument.

Measurement of the Acid Value of each Ethylene Polymer

Each sample, which had been precisely weighed, was dissolved in a neutralized xylene/n-butanol mixed solvent. The resulting solution was titrated with a pre-standardized 0.1N alcohol solution of sodium hydroxide. From the volume of the alcohol solution required for neutralization, the acid value of the ethylene polymer was calculated in accordance with the following formula:

$$\text{Acid Value} = \frac{\begin{matrix}\text{Alcohol solution} \\ \text{of sodium hydroxide}\end{matrix}(\text{m}\ell)\times F\times 56.1}{\text{Sample (g)}\times\text{nonvolatile}\times 0.01}$$

(F: Factor for the 0.1 N alcohol solution of NaOH)

EXAMPLES 1–24 & COMPARATIVE EXAMPLES 1–13

In each of these examples and comparative examples, a polymer solution of the corresponding HMW ethylene polymer and the corresponding LMW ethylene polymer, which are shown in the corresponding one of Table 2-1 to Table 2-6 and had been obtained as described above, were combined at the corresponding ratio shown in the same table, from which the solvent was then elimination to obtain a binder resin.

After 100 parts of the binder resin, 10 parts of carbon black, 5 parts of polypropylene wax and other necessary components were premixed in a Henschel mixer, the resultant mixture was kneaded in a twin-screw kneader which was controlled at 170 0C. The thus-kneaded mixture was cooled, crushed, finely pulverized and then sorted through a classifier, whereby a toner of from 5.0 to 25.0 μm in particle size was obtained.

Using the above toner, its charging rise property and the like were evaluated.

(i) Evaluation of charging rise property (T)

One gram of the toner and 49 g of carrier iron powder ("F95-100", trade name; product of Powdertec, Inc.) were mixed for 1 minute in a tumbler shaker mixer, and the quantity of triboelectricity was measured by a blow-off triboelectricity measuring instrument manufactured by Toshiba Chemical Corporation. These procedures were repeated in exactly the same manner except that the toner and the carrier iron powder were mixed for 60 minutes. The charging rise property was evaluated by relying upon the ratio of the quantity of triboelectricity obtained by the 60-minute mixing to that obtained by the 1-minute mixing, which will hereinafter be expressed as "Q60" and "Q1", respectively.

T=Q60/Q1

A: T≦2

B: 2<T≦3.5

C: 3.5<T (ii) Charge stability (S)

The difference between a quantity of electricity charged at low temperature and low humidity (15° C., 35%) (QLL) and a quantity of electricity charged at high temperature and high humidity (35° C, 75%) (QHH) was expressed in terms of a rate (absolute value) by the following calculation formula to evaluate the charge stability.

S=(QLL-QHH)/QLL

A: S≦0.2

B: 0.2<S≦0.4

C: 0.4<S (iii) Fixing property

Fixing property was evaluated in terms of a lowest temperature (TF) of a heating roll, which was required to make the optical density of a toner layer on an image at a solid black area of 2 cm×2 cm exceed 70% when measured by an ink densitometer after the toner layer was rubbed 50 times with an abrasive rubber eraser under a load of 250 g/$cm^2$ on a JSPSR(The Japan Society for Promotion of Scientific Research)-type crocking fastness testing machine. A lowest temperature of 150° C. or lower is considered to be appropriate for electrophotographic toners.

The measurement results of physical properties of the individual toners are shown in Table 2-1 to Table 2-6. In the table, an improper product as an electrophotographic toner is ranked to "c".

TABLE 1-1

Production Examples of HMW Ethylene Polymers

| Production Example | IP | E(DIFF) | Invention Production Example | | | | | | |
|---|---|---|---|---|---|---|---|---|---|
| Polymer No. | (eV) | (eV) | Polymer 1 | Polymer 2 | Polymer 3 | Polymer 4 | Polymer 5 | Polymer 6 | Polymer 7 |
| Monomer | | | | | | | | | |
| Styrene | 8.2 | 7.6 | 75.0 | 75.0 | 92.0 | 58.0 | 75.0 | 88.0 | 88.0 |
| n-Butyl acrylate | 9.8 | 11.1 | 0.0 | 0.0 | 0.0 | 0.0 | 0.0 | 0.0 | 0.0 |
| Methyl methacrylate | 9.2 | 9.6 | 0.0 | 0.0 | 0.0 | 0.0 | 0.0 | 0.0 | 0.0 |
| Monomer M | | | | | | | | | |
| Monobutyl maleate | 11.3 | 12.1 | 25.0 | 0.0 | 0.0 | 42.0 | 0.0 | 0.0 | 0.0 |
| Dioctyl fumarate | 11.2 | 12.1 | 0.0 | 0.0 | 0.0 | 0.0 | 0.0 | 0.0 | 12.0 |
| Glutaconic acid | 11.3 | 10.1 | 0.0 | 0.0 | 0.0 | 0.0 | 0.0 | 0.0 | 0.0 |
| 1,2,3-Propylene-tricarboxylic acid | 11.6 | 11.0 | 0.0 | 0.0 | 0.0 | 0.0 | 0.0 | 0.0 | 0.0 |
| Maleic anhydride | 11.8 | 11.9 | 0.0 | 0.0 | 8.0 | 0.0 | 0.0 | 12.0 | 0.0 |
| 2-Methacryloyloxy-ethyl succinate | 11.3 | 10.5 | 0.0 | 25.0 | 0.0 | 0.0 | 0.0 | 0.0 | 0.0 |
| Hydroxyethyl methacrylate* | 9.4 | 8.2 | 0.0 | 0.0 | 0.0 | 0.0 | 0.0 | 0.0 | 0.0 |
| 2-Furanylmethyl acrylate | 12.4 | 13.6 | 0.0 | 0.0 | 0.0 | 0.0 | 25.0 | 0.0 | 0.0 |
| 3-(α-chlorobenzylideneamino)-2,3-diphenylacrylonitrile** | 18.6 | 16.5 | 0.0 | 0.0 | 0.0 | 0.0 | 0.0 | 0.0 | 0.0 |
| Amount of monomer M (parts) | | | 25.0 | 25.0 | 8.0 | 42.0 | 25.0 | 12.0 | 12.0 |
| Mw (× $10^4$) | | | 28.5 | 32.2 | 24.6 | 30.6 | 27.4 | 23.1 | 33.6 |
| Mw/Mn | | | 17.4 | 18.1 | 20.6 | 21.4 | 18.6 | 24.1 | 23.2 |

*,**Monomers used in comparative examples, which are other than those usable in the present invention.

TABLE 1-2

Production Examples of HMW Vinyl Copolymer

| Production Example | IP | E(DIEF) | Comparative Example | | |
|---|---|---|---|---|---|
| Polymer No. | (eV) | (eV) | Polymer 8 | Polymer 9 | Polymer 10 |
| Monomer | | | | | |
| Styrene | 8.2 | 7.6 | 75.0 | 75.0 | 88.0 |
| n-Butyl acrylate | 9.8 | 11.1 | 0.0 | 0.0 | 12.0 |
| Methyl methacrylate | 9.2 | 9.6 | 0.0 | 0.0 | 0.0 |
| Monomer M | | | | | |
| Monobutyl maleate | 11.3 | 12.1 | 0.0 | 0.0 | 0.0 |
| Dioctyl fumarate | 11.2 | 12.1 | 0.0 | 0.0 | 0.0 |
| Glutaconic acid | 11.3 | 10.0 | 0.0 | 0.0 | 0.0 |
| 1,2,3-Propylene-tricarboxylic acid | 11.6 | 11.0 | 0.0 | 0.0 | 0.0 |
| Maleic anhydride | 11.8 | 11.9 | 0.0 | 0.0 | 0.0 |

TABLE 1-2-continued

Production Examples of HMW Vinyl Copolymer

| Production Example | IP | E(DIEF) | Comparative Example | | |
|---|---|---|---|---|---|
| Polymer No. | (eV) | (eV) | Polymer 8 | Polymer 9 | Polymer 10 |
| 2-Methacryloyloxy-ethyl succinate | 11.3 | 10.5 | 0.0 | 0.0 | 0.0 |
| Hydroxyethyl methacrylate | 9.4 | 8.2 | 25.0 | 0.0 | 0.0 |
| 2-Furanylmethyl acrylate | 12.4 | 13.6 | 0.0 | 0.0 | 0.0 |
| 3-(α-chlorobenzylideneamino)-2,3-diphenylacrylonitrile** | 18.6 | 16.5 | 0.0 | 25.0 | 0.0 |
| Amount of monomer M (parts) | | | 25.0 | 25.0 | 0.0 |
| Mw (× $10^4$) | | | 33.4 | 30.4 | 31.1 |
| Mw/Mn | | | 24.5 | 21.6 | 26.1 |

TABLE 2-1

Physical Properties of Toners

| | Toner | HMW | LMW | Mixing ratio | Charging rise property | | Charge stability | |
|---|---|---|---|---|---|---|---|---|
| | No. | Polymer | Polymer | (HMW/LMW) | T value | Ranking | S value | Ranking |
| Ex. 1 | Toner 1 | Polymer 1 | Polymer 21 | 50/50 | 1.2 | A | 0.11 | A |
| Ex. 2 | Toner 2 | Polymer 2 | Polymer 21 | 50/50 | 0.9 | A | 0.09 | A |
| Ex. 3 | Toner 3 | Polymer 3 | Polymer 21 | 50/50 | 1.0 | A | 0.04 | A |
| Ex. 4 | Toner 4 | Polymer 4 | Polymer 21 | 50/50 | 1.0 | A | 0.18 | A |
| Ex. 5 | Toner 5 | Polymer 5 | Polymer 21 | 50/50 | 1.3 | A | 0.05 | A |
| Ex. 6 | Toner 6 | Polymer 6 | Polymer 21 | 50/50 | 1.2 | A | 0.06 | A |
| Ex. 7 | Toner 7 | Polymer 7 | Polymer 21 | 50/50 | 1.7 | A | 0.17 | A |
| Comp. Ex. 1 | Toner 8 | Polymer 8 | Polymer 21 | 50/50 | 3.1 | B | 0.60 | C |
| Comp. Ex. 2 | Toner 9 | Polymer 9 | Polymer 21 | 50/50 | 4.4 | C | 0.32 | C |
| Comp. Ex. 3 | Toner 10 | Polymer 10 | Polymer 21 | 50/50 | 5.0 | C | 0.48 | C |

TABLE 2-2

Physical Properties of Toners

| | Toner | HMW | LMW | Mixing ratio | Charging rise property | | Charge stability | | Fixing property | |
|---|---|---|---|---|---|---|---|---|---|---|
| | No. | Polymer | Polymer | (HMW/LMW) | T value | Ranking | S value | Ranking | TF(° C.) | Ranking |
| Ex. 8 | Toner 11 | Polymer 1 | Polymer 21 | 10/90 | 1.9 | A | 0.16 | A | 114 | |
| Ex. 9 | Toner 12 | Polymer 1 | Polymer 21 | 25/75 | 1.5 | A | 0.13 | A | 121 | |
| Ex. 10 | Toner 13 | Polymer 1 | Polymer 21 | 75/25 | 0.9 | A | 0.09 | A | 139 | |
| Ex. 11 | Toner 14 | Polymer 1 | Polymer 21 | 90/10 | 0.8 | A | 0.08 | A | 149 | |
| Comp. Ex. 4 | Toner 15 | Polymer 1 | Polymer 21 | 3/97 | 3.5 | B | 0.41 | C | 100 | |
| Comp. Ex. 5 | Toner 16 | Polymer 1 | Polymer 21 | 97/3 | 0.8 | A | 0.09 | A | 168 | C |

TABLE 2-3

Physical Properties of Toners

| | Toner | HMW Polymer | | LMW | Mixing ratio | Charging rise property | | Charge stability | |
|---|---|---|---|---|---|---|---|---|---|
| | No. | Polymer No. | Mw × $10^4$ | Polymer | (HMW/LMW) | T value | Ranking | S value | Ranking |
| Ex. 12 | Toner 17 | Polymer 11 | 21.2 | Polymer 21 | 50/50 | 2.0 | A | 0.18 | A |
| Ex. 13 | Toner 18 | Polymer 12 | 46.4 | Polymer 21 | 50/50 | 1.0 | A | 0.10 | A |
| Ex. 14 | Toner 19 | Polymer 13 | 54.1 | Polymer 21 | 50/50 | 0.8 | A | 0.08 | A |

TABLE 2-3-continued

Physical Properties of Toners

| | Toner | HMW Polymer | | LMW | Mixing ratio | Charging rise property | | Charge stability | |
|---|---|---|---|---|---|---|---|---|---|
| | No. | Polymer No. | Mw × $10^4$ | Polymer | (HMW/LMW) | T value | Ranking | S value | Ranking |
| Comp. Ex. 6 | Toner 20 | Polymer 14 | 18.1 | Polymer 21 | 50/50 | 3.4 | B | 0.36 | B |
| Comp. Ex. 7 | Toner 21 | Polymer 15 | 101.4 | Polymer 21 | 50/50 | Unable to prepare a toner | | | |

TABLE 2-4

Physical Properties of Toners

| | Toner | HMW Polymer | | LMW | Mixing ratio | Charging rise property | | Charge stability | |
|---|---|---|---|---|---|---|---|---|---|
| | No. | Polymer No. | Mw/Mn | Polymer | (HMW/LMW) | T value | Ranking | S value | Ranking |
| Ex. 15 | Toner 22 | Polymer 16 | 8.6 | Polymer 21 | 50/50 | 1.1 | A | 0.11 | A |
| Ex. 16 | Toner 23 | Polymer 17 | 49.1 | Polymer 21 | 50/50 | 1.5 | A | 0.14 | A |
| Ex. 17 | Toner 24 | Polymer 18 | 118.4 | Polymer 21 | 50/50 | 1.9 | A | 0.20 | A |
| Comp. Ex. 8 | Toner 25 | Polymer 19 | 5.5 | Polymer 21 | 50/50 | 2.4 | B | 0.51 | C |
| Comp. Ex. 9 | Toner 26 | Polymer 20 | 320.0 | Polymer 21 | 50/50 | Unable to prepare a toner | | | |

TABLE 2-5

Physical Properties of Toners

| | Toner | HMW | LMW Polymer | | Mixing ratio | Charging rise property | | Charge stability | | Fixing property | |
|---|---|---|---|---|---|---|---|---|---|---|---|
| | No. | Polymer | Polymer No. | Mw | (HMW/LMW) | T value | Ranking | S value | Ranking | TF(° C.) | Ranking |
| Ex. 18 | Toner 27 | Polymer 1 | Polymer 22 | 3,500 | 50/50 | 1.9 | A | 0.18 | A | 128 | |
| Ex. 19 | Toner 28 | Polymer 1 | Polymer 23 | 9,800 | 50/50 | 1.0 | A | 0.08 | A | 132 | |
| Ex. 20 | Toner 29 | Polymer 1 | Polymer 24 | 17,500 | 50/50 | 0.8 | A | 0.07 | A | 139 | |
| Comp. Ex. 10 | Toner 30 | Polymer 1 | Polymer 25 | 1,800 | 50/50 | Unable to prepare a toner | | | | | |
| Comp. Ex. 11 | Toner 31 | Polymer 1 | Polymer 26 | 55,000 | 50/50 | 0.7 | A | 0.06 | A | 156 | C |

TABLE 2-6

Physical Properties of Toners

| | Toner | HMW | LMW Polymer | | Total acid value | Mixing ratio | Charging rise property | | Charge stability | |
|---|---|---|---|---|---|---|---|---|---|---|
| | No. | Polymer | Polymer No. | Acid value | (mgKOH/g) | (HMW/LMW) | T value | Ranking | S value | Ranking |
| Ex. 21 | Toner 32 | Polymer 1 | Polymer 27 | 0.7 | 4.3 | 50/50 | 1.4 | A | 0.15 | A |
| Ex. 22 | Toner 33 | Polymer 1 | Polymer 28 | 14.9 | 11.1 | 50/50 | 0.9 | A | 0.16 | A |
| Ex. 23 | Toner 34 | Polymer 1 | Polymer 29 | 136.1 | 71.7 | 50/50 | 0.5 | A | 0.19 | A |
| Ex. 24 | Toner 35 | Polymer 2 | Polymer 28 | 14.9 | 10.0 | 50/50 | 0.8 | A | 0.17 | A |
| Comp. Ex. 12 | Toner 36 | Polymer 1 | Polymer 30 | 0.0 | 3.6 | 50/50 | 3.6 | C | 0.22 | B |
| Comp. Ex. 13 | Toner 37 | Polymer 1 | Polymer 31 | 208.6 | 107.9 | 50/50 | 1.6 | A | 1.40 | C |

Production Examples 32–41 (Production of HMW Vinyl Copolymer)

A four-necked flask was fitted with a condenser, a thermometer, a nitrogen gas inlet tube and a stirrer and was then charged with 65.0 parts of styrene monomer, 20.0 parts of dioctyl fumarate and 5.0 parts of maleic anhydride. After the internal temperature was raised to 110° C., the contents were maintained at the same temperature and were subjected to bulk polymerization for 7.3 hours. Then, 0.2 part of divinylbenzene, 70 parts of xylene (diluent solvent) and 5 parts of maleic anhydride (additional monomer) were added, and further, 0.3 part of di-t-butyl peroxide, 30.0 parts of xylene and 0.1 part of divinylbenzene and 5.0 parts of 2-methacryloyloxyethyl succinate, which had been mixed into a solution beforehand, were continuously added dropwise over 7.0 hours while maintaining the reaction system at 130° C. (solution polymerization). The reaction was then allowed to continue for 1 hour (post-polymerization) and the polymerization of any remaining portion of the styrene monomer was ended, whereby Polymer 32 was obtained.

Polymers 33 to 47 were obtained as in Production Example 32 under their corresponding conditions shown in Table 3.

TABLE 4

Production Examples of LMW Ethylene Polymers

| Production Example | Invention Production example | | Comparative Production example | |
|---|---|---|---|---|
| Polymer No. | Polymer 42 | Polymer 43 | Polymer 44 | Polymer 45 |
| Styrene | 95.0 | 55.0 | 100.0 | 100.0 |
| Methacrylic acid | 5.0 | 45.0 | 0.0 | 0.0 |
| Weight average molecular weight (Mw) | 5,800 | 4,900 | 5,100 | 31,000 |
| Acid value (mgKOH/g) | 3.2 | 29.3 | 0.0 | 2.9 |

TABLE 3

Production Examples of HMW Ethylene Polymers

| Production Example | Production Example | | | | | | | | | |
|---|---|---|---|---|---|---|---|---|---|---|
| Polymer No. | Polymer 32 | Polymer 33 | Polymer 34 | Polymer 35 | Polymer 36 | Polymer 37 | Polymer 38 | Polymer 39 | Polymer 40 | Polymer 41 |
| Bulk Polymeriz'n | | | | | | | | | | |
| Styrene | 65.0 | 65.0 | 56.0 | 56.0 | 63.0 | 63.0 | 85.0 | 30.0 | 45.0 | 65.0 |
| Monomer (M) | | | | | | | | | | |
| Maleic anhydride | 5.0 | 10.0 | 5.0 | 10.0 | 2.0 | 3.0 | 10.0 | 30.0 | 10.0 | 5.0 |
| Dioctyl fumarate | 20.0 | 20.0 | 14.0 | 14.0 | 14.0 | 14.0 | 0.0 | 20.0 | 0.0 | 20.0 |
| AM* | | | | | | | | | | |
| Maleic anhydride | 5.0 | 0.0 | 5.0 | 0.0 | 1.0 | 0.0 | 0.0 | 0.0 | 0.0 | 5.0 |
| Soln. pol'n | | | | | | | | | | |
| 2-Methacryloyloxy-ethyl succinate | 5.0 | 5.0 | 20.0 | 20.0 | 20.0 | 20.0 | 5.0 | 20.0 | 45.0 | 5.0 |
| Weight average molecular weight (Mw) | 345,000 | 304,000 | 377,000 | 321,000 | 316,000 | 298,000 | 247,000 | 248,000 | 301,000 | 185,000 |

*Additional monomer

Production Examples 42–45 (Production of LMW vinyl copolymer)

A 5-ℓ four-necked flask was fitted with a condenser, a thermometer, a nitrogen gas inlet tube and a stirrer and was then charged with 100.0 parts of xylene as a solvent. After the internal temperature was raised to a reflux temperature while introducing nitrogen gas, a mixture of 95.0 parts of styrene monomer, 5.0 parts of methacrylic acid and 10.0 parts of t-butyl peroxy-2-ethylhexanoate was continuously added dropwise over 6.5 hours. The reaction was then allowed to continue for 1 hour to conduct polymerization of any remaining portions of the copolymerizable monomers, whereby Polymer 42 was obtained.

Polymers 43 to 45 were obtained as in Production Example 42 under their corresponding conditions shown in Table 4. The Mws and acid values of the polymers so obtained are also shown in Table 4.

EXAMPLES 25–34 & COMPARATIVE EXAMPLES 14–19

In each of these examples and comparative examples, a polymer solution of the corresponding HMW vinyl copolymer and the corresponding LMW vinyl copolymer, which are shown in Table 5 or Table 6 and had been obtained as described above, were combined at the corresponding ratio shown in the same table, from which the solvent was then elimination to obtain a binder resin.

After 100 parts of the binder resin, 10 parts of carbon black, 5 parts of polypropylene wax and other necessary components were premixed in a Henschel mixer, the resultant mixture was kneaded in a twin-screw kneader which was controlled at 170° C. The thus-kneaded mixture was cooled, crushed, finely pulverized and then sorted through a classifier, whereby a toner of from 6.0 to 18.0 μm in particle size was obtained.

Using toners obtained as described above, their charge rise properties and fixing stabilities were then evaluated as described above. Further, with respect to each of the toners, its environmental stability (humidity stability) of a quantity of charged electricity was also evaluated as will be described next. Environmental stability (humidity stability) of a quantity of charged electricity:

The difference between a quantity of electricity charged at low temperature and low humidity (15° C.,35%) (QLL) and a quantity of electricity charged at high temperature and high humidity (35° C.,75%) (QHH) was expressed in terms of a percentage (S; absolute value) by the following calculation formula to evaluate the charge stability.

S=(QLL−QHH)/QLL×100(%)

A+++:S≦2.5

A++:2.5<S≦6.0

A+:6.0<S≦20.0

The measurement results of physical properties of the individual toners are shown in Table 5 to Table 6.

It is to be noted that the above evaluation method is for most preferred embodiments according to the present invention and is intended for the evaluation of charge stability (S) different in level from that described above under item (ii).

TABLE 7

Production of HMW Vinyl Copolymer

| | Invention Production Example | | | |
|---|---|---|---|---|
| Polymer No. | Polymer 46 | Polymer 47 | Polymer 48 | Polymer 49 |
| Bulk polymerization | | | | |
| Styrene Monomer (M) | 61.0 | 61.0 | 61.0 | 71.0 |
| Maleic anhydride | 5.0 | 5.0 | 5.0 | 0.0 |
| Dioctyl fumarate | 15.0 | 15.0 | 15.0 | 15.0 |
| AM* | | | | |
| Maleic anhydride | 5.0 | 5.0 | 5.0 | 0.0 |

TABLE 5

Physical Properties of Toners

| | Toner | HMW | LMW | Mixing ratio | Charging rise property | | Environmental charge stability | | |
|---|---|---|---|---|---|---|---|---|---|
| | No. | Polymer | Polymer | (LMW/HMW) | T value | Ranking | S value | Ranking | TG(° C.) |
| Ex. 25 | Toner 38 | Polymer 32 | Polymer 42 | 50/50 | 1.3 | A | 1.1 | $A^{+++}$ | 56.8 |
| Ex. 26 | Toner 39 | Polymer 33 | Polymer 42 | 50/50 | 1.0 | A | 0.9 | $A^{+++}$ | 58.1 |
| Ex. 27 | Toner 40 | Polymer 34 | Polymer 42 | 50/50 | 0.7 | A | 1.6 | $A^{+++}$ | 52.1 |
| Ex. 28 | Toner 41 | Polymer 35 | Polymer 42 | 50/50 | 0.5 | A | 1.3 | $A^{+++}$ | 54.4 |
| Ex. 29 | Toner 42 | Polymer 36 | Polymer 42 | 50/50 | 0.7 | A | 1.2 | $A^{+++}$ | 55.6 |
| Ex. 30 | Toner 43 | Polymer 37 | Polymer 42 | 50/50 | 0.3 | A | 1.1 | $A^{+++}$ | 57.1 |
| Ex. 32 | Toner 45 | Polymer 38 | Polymer 43 | 50/50 | 0.6 | A | 2.1 | $A^{+++}$ | 55.6 |
| Ex. 33 | Toner 46 | Polymer 32 | Polymer 42 | 85/15 | 0.9 | A | 1.0 | $A^{+++}$ | 53.4 |
| Ex. 34 | Toner 47 | Polymer 32 | Polymer 42 | 15/85 | 1.6 | A | 2.8 | $A^{++}$ | 58.9 |

TABLE 6

Physical Properties of Toners

| | Toner | HMW | LMW | Mixing ratio | Charging rise property | | Environmental charge stability | |
|---|---|---|---|---|---|---|---|---|
| | No. | Polymer | Polymer | (HMW/LMW) | T value | Ranking | S value | Ranking |
| Comp. Ex. 14 | Toner 48 | Polymer 39 | Polymer 42 | 50/50 | 2.5 | B | 6.1 | $A^{+}$ |
| Comp. Ex. 15 | Toner 49 | Polymer 40 | Polymer 42 | 50/50 | 2.1 | B | 8.6 | $A^{+}$ |
| Comp. Ex. 16 | Toner 50 | Polymer 41 | Polymer 42 | 50/50 | 2.8 | B | 2.9 | $A^{++}$ |
| Comp. Ex. 17 | Toner 51 | Polymer 32 | Polymer 42 | 0/100 | 3.4 | B | 4.5 | $A^{++}$ |
| Comp. Ex. 18 | Toner 52 | Polymer 32 | Polymer 44 | 50/50 | 4.2 | C | 2.7 | $A^{++}$ |
| Comp. Ex. 19 | Toner 53 | Polymer 32 | Polymer 45 | 50/50 | 2.4 | B | 3.0 | $A^{++}$ |

Production Examples 46–49 (Production of HMW Vinyl Copolymer)

Under the production conditions shown in Table 7, Polymers 46–49 were obtained in a similar manner as Production Example 32.

TABLE 7-continued

Production of HMW Vinyl Copolymer

| Polymer No. | Invention Production Example Polymer 46 | Polymer 47 | Polymer 48 | Polymer 49 |
|---|---|---|---|---|
| Solution polymerization | | | | |
| 2-Methacryloyloxyethyl succinate | 0.0 | 0.0 | 0.0 | 0.0 |
| 2-Acryloyloxypropyl succinate | 14.0 | 0.0 | 0.0 | 14.0 |
| 2-Methacryloyloxyethyl malonate | 0.0 | 14.0 | 0.0 | 0.0 |

TABLE 7-continued

Production of HMW Vinyl Copolymer

| Polymer No. | Invention Production Example Polymer 46 | Polymer 47 | Polymer 48 | Polymer 49 |
|---|---|---|---|---|
| 2-Methacryloyloxypropyl glutarate | 0.0 | 0.0 | 14.0 | 0.0 |
| Weight average molecular weight (Mw) | 356,000 | 342,000 | 325,000 | 351,000 |

*AM: Additional monomer

Production Examples 50–51 (Production of LMW Vinyl Copolymer)

Under the production conditions shown in Table 8, Polymers 50–51 were obtained in a similar manner as Production Example 42.

TABLE 8

Production of LMW Vinyl Copolymer

| Polymer No. | Invention Production Example Polymer 50 | Polymer 51 |
|---|---|---|
| Styrene | 95.0 | 55.0 |
| Methacrylic acid | 5.0 | 45.0 |
| Weight average molecular weight (Mw) | 5,800 | 4,900 |
| Acid value (mgKOH/g) | 3.2 | 29.3 |

EXAMPLES 35–39

In each of these examples and comparative examples, a polymer solution of the corresponding HMW ethylene polymer and the corresponding LMW ethylene polymer, which are shown in Table 9 and had been obtained as described above, were combined at the corresponding ratio shown in the same table, from which the solvent was then elimination to obtain a binder resin.

Following the procedures of Example 25, the binder was formulated into an electrophotographic toner.

Using toners obtained as described above, their charge rise properties, environmental stabilities (humidity stabilities) of quantities of charged electricity and their fixing stabilities were evaluated as in Example 25.

TABLE 9

Physical Properties of Toners

| | Toner No. | HMW Polymer | LMW Polymer | Mixing ratio (HMW/LMW) | Charging rise property T value | Ranking | Environmental charge stability S value | Ranking | TG(° C.) |
|---|---|---|---|---|---|---|---|---|---|
| Ex. 35 | Toner 54 | Polymer 46 | Polymer 50 | 50/50 | 0.7 | A | 1.2 | $A^{+++}$ | 58.2 |
| Ex. 36 | Toner 55 | Polymer 47 | Polymer 50 | 50/50 | 0.6 | A | 1.4 | $A^{+++}$ | 56.4 |
| Ex. 37 | Toner 56 | Polymer 48 | Polymer 50 | 50/50 | 0.4 | A | 1.1 | $A^{+++}$ | 57.1 |
| Ex. 38 | Toner 57 | Polymer 49 | Polymer 50 | 50/50 | 0.8 | A | 1.2 | $A^{+++}$ | 59.2 |
| Ex. 39 | Toner 58 | Polymer 46 | Polymer 51 | 50/50 | 0.7 | A | 1.2 | $A^{+++}$ | 54.3 |

Referential Production Examples 1–2

Experiments were conducted with the amount of the monomer (M) set outside the range preferred for the present invention as shown in Table 10.

Production conditions employed for the production of HMW vinyl copolymer ("Polymer 52" and "Polymer 53") and physical properties of toners ("Toner 59" and "Toner 60") obtained using the HMW vinyl copolymer are presented in Table 10 and Table 11. The charge stabilities shown in Table 11 were evaluated in accordance with the evaluation method of the charge stability (ii).

TABLE 10

Production Conditions for HMW Vinyl Copolymer

| Production Example No. Polymer No. | Referential Production Example No. 1 Polymer 52 | No. 2 Polymer 53 |
|---|---|---|
| Monomer | | |
| Styrene | 98.0 | 50.0 |
| Monobutyl maleate | 2.0 | 0.0 |
| Dioctyl fumarate | 0.0 | 50.0 |
| Amount of monomer (M) (parts) | 2.0 | 50.0 |
| Mw (× $10^4$) | 27.0 | 33.9 |
| Mw/Mn | 18.9 | 23.1 |

TABLE 11

Physical Properties of Toners

| | Toner | HMW | LMW | Mixing ratio | Charging rise property | | Environmental charge stability | |
|---|---|---|---|---|---|---|---|---|
| | No. | Polymer | Polymer | (HMW/LMW) | T value | Ranking | S value | Ranking |
| Ref. Ex. 1 | Toner 59 | Polymer 52 | Polymer 21 | 50/50 | 4.9 | C | 0.30 | B |
| Ref. Ex. 2 | Toner 60 | Polymer 53 | Polymer 21 | 50/50 | 3.5 | B | 0.51 | C |

We claim:

1. A resin composition for an electrophotographic charge control agent-free toner, comprising:

5 to 95 parts by weight of a high molecular weight vinyl copolymer having a weight average molecular weight of from 200,000 to 1,000,000 and a ratio of the weight average molecular weight to a number average molecular weight of from 8 to 300, and 95 to 5 parts by weight of a low molecular weight vinyl copolymer having a weight average molecular weight of from 3,000 to 20,000; and at least one of said high molecular weight vinyl copolymer and said low molecular weight vinyl copolymer being a vinyl copolymer which has been obtained by conducting polymerization in the presence of a monomer (M) wherein said monomer (M) is contained in an amount of from 8 to 45 parts by weight in 100 parts by weight of monomers which make up said high molecular weight vinyl copolymer and wherein said monomer (M) is, in combination, 1 to 20 parts by weight of at least one monomer selected from the group consisting of maleic anhydride, itaconic anhydride, glutaconic anhydride and 2-carboxycinnamic anhydride the balance of monomer (M) being at least one of (meth) acryloyloxyalkyl dicarboxylic acid esters represented by the formula (1):

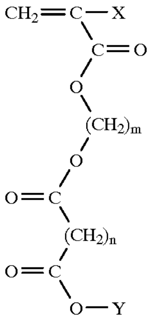

(1)

wherein m stands for an integer of from 1 to 7, n stands for an integer of from 1 to 3, X represents H or $CH_3$, and Y represents H, an alkyl group having 1 to 8 carbon atoms or a benzyl group wherein said polymerization is conducted in the presence of at least one polyfunctional monomer and polyfunctional initiator.

2. The resin composition according to claim 1, wherein said low molecular weight vinyl copolymer has an acid value of from 0.5 to 200 mgKOH/g.

3. The resin composition according to claim 1, wherein said resin composition comprising said high molecular weight vinyl copolymer and said low molecular weight vinyl copolymer has a total acid value of from 0.5 to 200 mgKOH/g.

* * * * *